UNITED STATES PATENT OFFICE.

E. A. WIBLE, OF GEORGETOWN, CALIFORNIA.

IMPROVEMENT IN PRESERVING GRAPES AND OTHER FRUITS.

Specification forming part of Letters Patent No. 35,556, dated June 10, 1862.

*To all whom it may concern:*

Be it known that I, E. A. WIBLE, of Georgetown, in the county of Eldorado and State of California, have invented a new and Improved Process of Preserving Grapes or other Fruits in their Natural State; and I do hereby declare that the following is a full, clear, and exact description of the same.

This invention consists in packing the fruit, sprinkled with powdered alum, in layers between layers of dry sand in air-tight boxes. The sand used for this purpose should be kiln-dried, so as to be perfectly free from moisture. The boxes may be of wood, coated inside or outside, or both inside and outside, with some composition impervious to air and to the moisture of the atmosphere. The composition which I propose to use is made of two parts, by weight, of beeswax, three parts of glue, and one part of gum-arabic, prepared by melting the beeswax by heat, then adding the glue and gum-arabic, and boiling until the two latter are dissolved. This composition should be applied while hot enough to keep it melted. The boxes may be from six to twelve inches deep; but their length and breadth are not very material.

To pack the fruit, the bottoms of the boxes are first covered with a layer of sand, and upon that is placed a layer of ripe fruit, which is then sprinkled or dusted over with finely-powdered alum from a fine sieve in sufficient quantity to perceptibly cover its surface, the object being to harden the skin. The interstices between the fruit are then filled with sand, and the layer of fruit covered with sand preparatory to another layer of fruit being put in the box, and the packing in this way, a layer of sand and a layer of fruit alternately, every layer of fruit sprinkled with the powdered alum, is continued to the top of the box, finishing with a layer of sand. The cover of the box is then put on and fastened, the joint being made perfectly tight by the application of the composition hereinbefore specified, or any other composition impervious to air and the moisture of the atmosphere.

Grapes put up in this way should be packed in the bunches. Other fruits may be packed in the manner most convenient.

Grapes may be preserved in this way in a dry place and at a moderate temperature from the time of gathering in one year till the time of gathering in the next year.

What I claim as my invention, and desire to secure by Letters Patent, is—

The packing of fruit sprinkled with powdered alum in layers between layers of dry sand in air-tight boxes, substantially as herein specified.

ELIAS A. WIBLE.

Witnesses:
   J. J. WILLIAMS,
   W. BIXBY.